Nov. 15, 1955 M. DLUGATCH 2,723,552
HOOD LATCH LOCKING DEVICE
Filed July 29, 1953 2 Sheets-Sheet 1
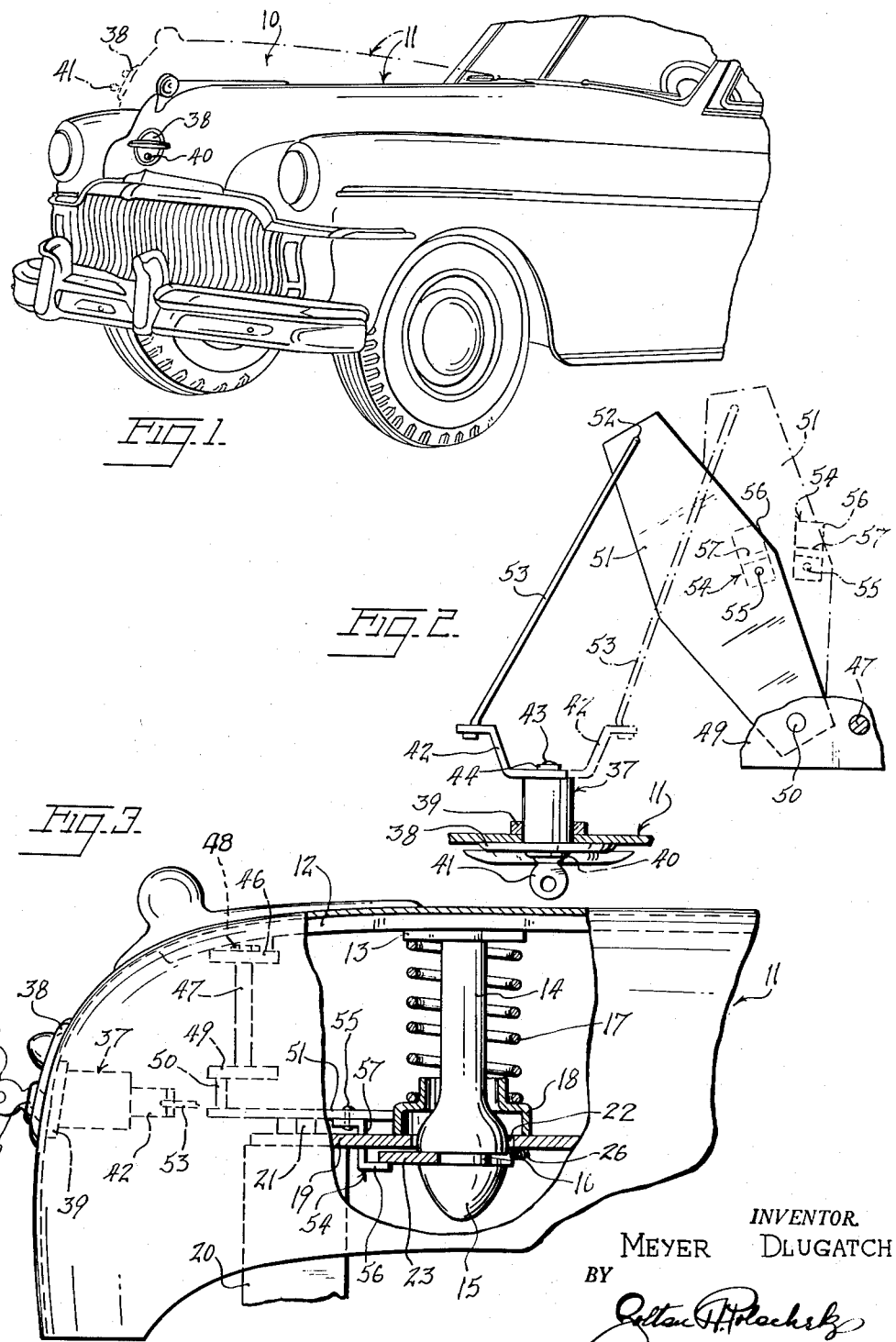
INVENTOR.
MEYER DLUGATCH
BY
ATTORNEY Nov. 15, 1955  M. DLUGATCH  2,723,552
HOOD LATCH LOCKING DEVICE
Filed July 29, 1953  2 Sheets-Sheet 2
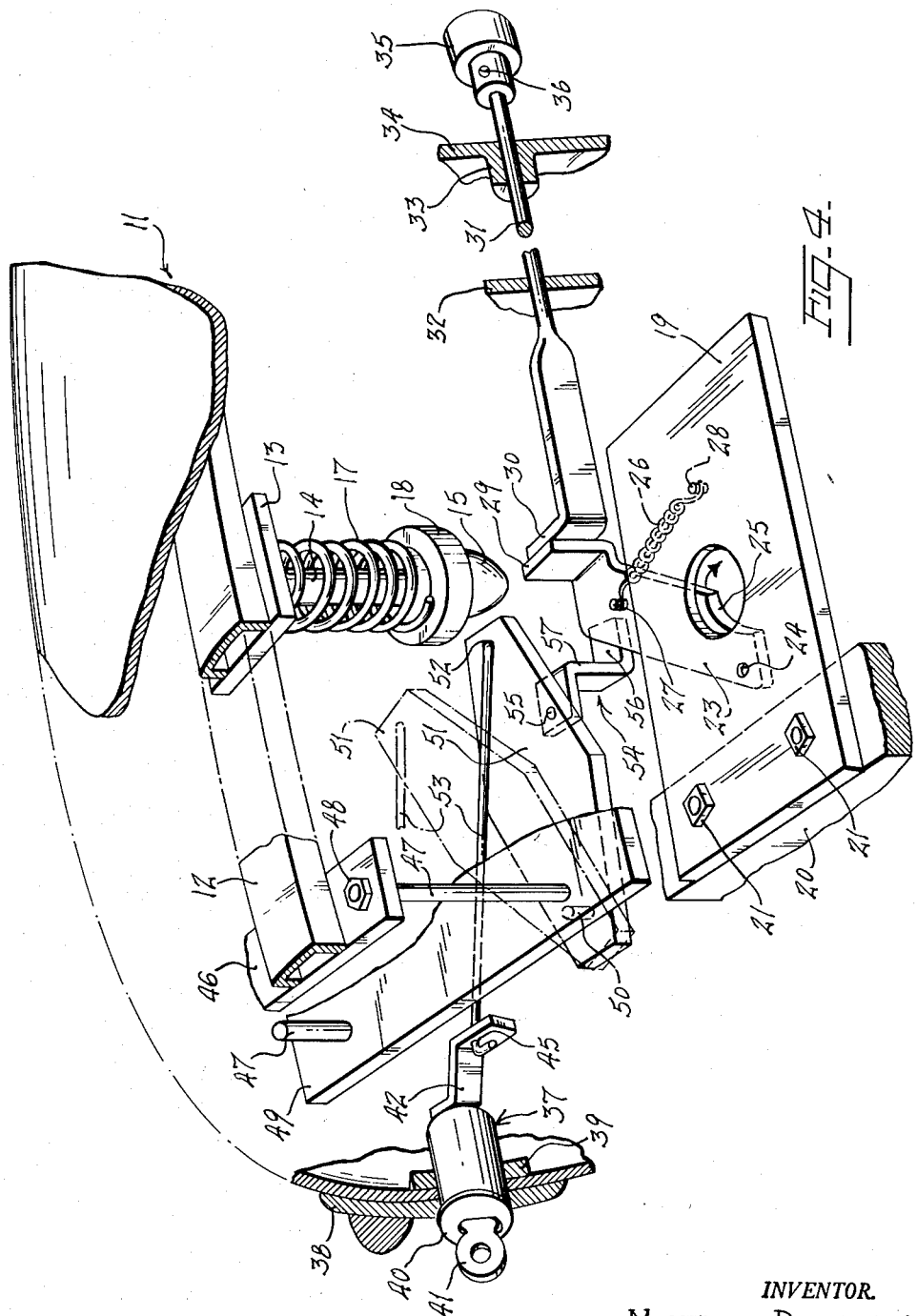
INVENTOR.
MEYER DLUGATCH
BY
Zoltan Holschek
ATTORNEY United States Patent Office 2,723,552
Patented Nov. 15, 1955

2,723,552

HOOD LATCHING LOCKING DEVICE

Meyer Dlugatch, New York, N. Y.

Application July 29, 1953, Serial No. 371,029

4 Claims. (Cl. 70—240)

This invention relates to locking devices for automobile hood latches.

It is an object of the present invention to provide a locking device which will prevent any motion of the conventional hood latches of automobiles, the locking device being locked by a key which operates a cylinder lock at the front portion of the automobile hood.

It is another object of the present invention to provide a locking device for automobile hood latches which will lock the hood latch of the automobile by means of a lock cylinder operated by one of the original keys furnished with the automobile when it is purchased.

It is still another object of the present invention to provide a hood latch of the above type which will prevent unauthorized persons from opening the hood and removing the battery or parts of the motor, and which will prevent the unauthorized persons from stealing the automobile itself by means of crossed ignition wires.

Other objects of the present invention are to provide a hood latch locking device bearing the above objects in mind which is of simple construction, inexpensive to manufacture, has a minimum number of parts, is easy to use and efficient in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary front perspective view of an automobile showing the invention incorporated thereon.

Fig. 2 is a top plan view of the locking device, shown alone.

Fig. 3 is a side elevational view of an automobile hood showing the invention incorporated thereon and shown partly broken away.

Fig. 4 is a fragmentary perspective view of the interior of the hood and showing the hood latch locking device in operative engagement with the hood latch.

Referring now to the drawings, 10 represents an automobile having a hood 11 of the type adapted to be rotated upwardly when it is desired to have access to the motor.

The usual longitudinally extending frame member 12 is secured to the top inner face of hood 11 and serves to support a plate 13 from which depends a shaft 14 terminating in a bullet-nosed head 15. The head 15 is provided with the usual peripheral groove 16.

A spring 17 sleeves shaft 14 and is suitably secured at its upper end to the lower surface of plate 13, the lower end of the spring being connected to a flanged cup member 18 open at the top and bottom and receiving the head 15 and shaft 14 freely therethrough.

A plate 19 is secured at one end to the top of motor housing 20 by means of bolts 21, the plate 19 being provided with an opening 22 adapted to receive the head 15 downwardly therethrough (Fig. 3).

A latch 23 is pivotally connected to the undersurface of plate 19 by means of a pin 24, the latch 23 having an arcuate cut-out portion 25, adapted to be received within the peripheral groove 16 when the head 15 is within opening 22. A spring 26 is connected at one end to a pin 27 extending upwardly on the outer portion of the latch 23, the spring 26 passing under the plate 19 and being connected at its other end to a pin 28 secured to the undersurface of the plate 19. Thus, the spring 26 will bias the latch 23 in the direction of the arrow of Fig. 4 and will retain the head 15 in the locked position.

The end of latch 23 remote from the cut-out 25 is integrally formed with an upwardly extending flange 29 which abuts a corresponding flange 30 provided on the end of a release rod 31, the rod 31 being slidably mounted longitudinally through a plate 32 and a bearing 33 provided in the dashboard 34. A knob 35 is secured to the end of the rod 31 by means of a screw 36 and permits the motorist to push the rod 31 forward to move the latch 23 against the action of spring 26, releasing the head 15 and permitting the hood to be sprung upwardly under the action of the spring 17, all in a manner well known to those skilled in the art.

In the practice of my invention, a cylinder lock 37 of the 180 degree turn type is mounted at the front of the hood 11 by means of the plates 38 and 39, the front plate 40 of the lock having the keyhole opening being disposed on the outside of the hood whereby to receive a key 41.

A double-angled bracket 42 is secured at one end to the rear revolving portion of the cylinder 37 by means of a screw 43 and washer 44, the other end of the bracket 42 being provided with an opening 45.

A plate 46 is suitably secured to the frame member 12 at the front thereof and supports a pair of depending bolts 47 by means of nuts 48 (Fig. 4). A horizontal plate 49 is supported at the lower ends of the bolts 47 and serves to support a depending pin 50. It will be noted that the plate 49 passes over the bracket 42 which is secured to the cylinder 37 in such a manner that the bracket is in a horizontal position extending to the right when the cylinder is in the locked position. Thus, upon rotation of the key 41 in a clockwise direction 180 degrees, the bracket 42 will rotate 180 degrees to the left below the plate 49.

A plate 51 is pivotally connected to the bottom of pin 50 and is adapted to rotate in a horizontal plane below the plate 49. The end of plate 51 remote from the pin 50 is provided with an opening 52 in which is rotatably secured one end of a link 53, the other end of the link 53 being rotatably secured within the opening 45 of the bracket 42. Thus, as the key 41 is turned 180 degrees in a clockwise direction, the bracket 42 will rotate 180 degrees in a clockwise direction below plate 49 pulling the plate 51 away from the latch 23 to the dotted line position of Fig. 4.

A double-angle plate 54 is secured to the undersurface of plate 51 by means of a rivet 55, the lower horizontal portion 56 thereof passing under the latch 23 with the vertical portion 57 thereof abutting the forward edge of the latch 23 when the plate 51 is in the full line position of Fig. 4. In this position, the double-angle plate 54 will effectively prevent any motion of the latch 23 under the action of the release rod 31. Thus, it is only by rotating the key 41 in cylinder 37 to move the plate 51 away from the latch 23 that the latter can be released by the release rod 31.

The key 41 will be provided with the original keys furnished with the automobile when it is purchased.

Thus, when the key 41 is turned, the link 53 will move the free end of the plate 51 on pivot 50 and thus, it will move the double-angle bracket 54 away from the hood latch 23 which in turn permits the latter to be pulled or pushed to the disengaging position by the attendant. When the key 41 is rotated to its original position and removed, the double-angle bracket 54 is again moved adjacent the hood latch 23 to lock the same and to prevent unauthorized persons from opening the hood 11.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secured by United States Letters Patent is:

1. In an automobile hood latch assembly including a pivoted latch adapted to be rotated in and out of engagement with a depending member carried by the hood, a cylinder lock mounted in the front of the hood and operable from the exterior thereof, a plate pivotally mounted within the hood and adapted to be rotated adjacent the hood latch, means carried by said plate adapted to engage the hood latch whereby to prevent movement thereof, and linkage means interconnecting said plate and said cylinder lock whereby to lock said plate against the hood latch when said cylinder lock is locked and to rotate said plate away from the hood latch when said cylinder lock is opened by a key.

2. In an automobile hood latch assembly including a pivoted plate mounted above the motor and adapted to be rotated in and out of engagement with a depending member carried by the hood, a cylinder lock mounted in the front of the hood, a plate pivoted in a horizontal plane within the hood and adapted to be rotated adjacent the hood latch, an angle bracket carried on the undersurface of said pivoted plate and adapted to lock the hood latch in a locked position when said plate is rotated in said horizontal plane, and linkage means interconnecting said pivoted plate and said cylinder lock.

3. In an automobile hood latch assembly including a pivoted plate mounted above the motor and adapted to be rotated in and out of engagement with a depending member carried by the hood, a cylinder lock mounted in the front of the hood, a plate pivoted in a horizontal plane within the hood and adapted to be rotated adjacent the hood latch, an angle bracket carried on the undersurface of said pivoted plate and adapted to lock the hood latch in a locked position when said plate is rotated in said horizontal plane, and linkage means interconnecting said pivoted plate and said cylinder lock, said linkage means comprising an angle bracket secured to the inner rotating end of said cylinder lock, said bracket at the end thereof having an opening, said pivoted plate at its free end having a second opening and an elongated rod pivotally mounted at each end within said openings in said bracket and pivoted plate.

4. In an automobile hood latch assembly including a plate adapted to be rotated in and out of engagement with a depending member carried by the hood, a cylinder lock mounted in the front of the hood and adapted to be rotated 180 degrees upon the insertion therein of the key, a double-angle bracket fixedly carried at the inner rotating end of said cylinder lock and adapted to rotate therewith, said double-angle bracket at its free end having an opening, a first horizontal plate suspended from the hood above said double-angle bracket, a second plate pivotally mounted below said first plate, said second plate being adapted to be rotated adjacent the hood latch, said second plate at the free end thereof having an opening, an elongated rod pivotally mounted at each end within said openings in said second plate and said double-angle bracket, and a double-angle bracket secured to the undersurface of said second plate and having a horizontal portion adapted to slide below the hood latch and a vertical portion adapted to abut the forward edge of the hood latch whereby to lock the hood latch when said lock cylinder is locked.

References Cited in the file of this patent

UNITED STATES PATENTS

| | | |
|---|---|---|
| 1,536,773 | Ciaccio | May 5, 1925 |
| 1,805,042 | Heine | May 12, 1931 |